May 29, 1951 V. V. LONG 2,555,048
SAW AND GRINDER ATTACHMENT FOR DRILL PRESSES
Filed Aug. 2, 1948 2 Sheets-Sheet 1

INVENTOR.
Verne V. Long,
BY Victor J. Evans & Co.
ATTORNEYS

May 29, 1951  V. V. LONG  2,555,048
SAW AND GRINDER ATTACHMENT FOR DRILL PRESSES
Filed Aug. 2, 1948  2 Sheets-Sheet 2

INVENTOR.
Verne V. Long.
BY Victor J. Evans & Co.
ATTORNEYS

Patented May 29, 1951

2,555,048

UNITED STATES PATENT OFFICE 2,555,048

SAW AND GRINDER ATTACHMENT FOR DRILL PRESSES

Verne V. Long, Torrington, Wyo.

Application August 2, 1948, Serial No. 42,042

3 Claims. (Cl. 143—47)

This invention relates to a drill press saw and grinder.

It is an object of the present invention to provide a saw and grinder attachment for a drill press which has a drive shaft extending from the same adapted to fit the chuck of the drill press to be driven by it and wherein the attachment may be braced against rotation by connection with the column of the drill press while permitting vertical adjustment of the attachment on the drill press with the chuck and wherein the guard for the saw is an integral part of the attachment.

Other objects of the present invention are to provide a saw and grinder attachment for drill presses which is of simple construction, easy to attach to the drill press, inexpensive to manufacture, has a minimum number of parts, convenient to use and efficient in operation.

For other objects and for a better understanding of the invention, reference may be had to the following detailed description taken in connection with the accompanying drawings, in which Fig. 1 is a fragmentary elevational view of a drill press and of the attachment connected thereto.

Figure 1:
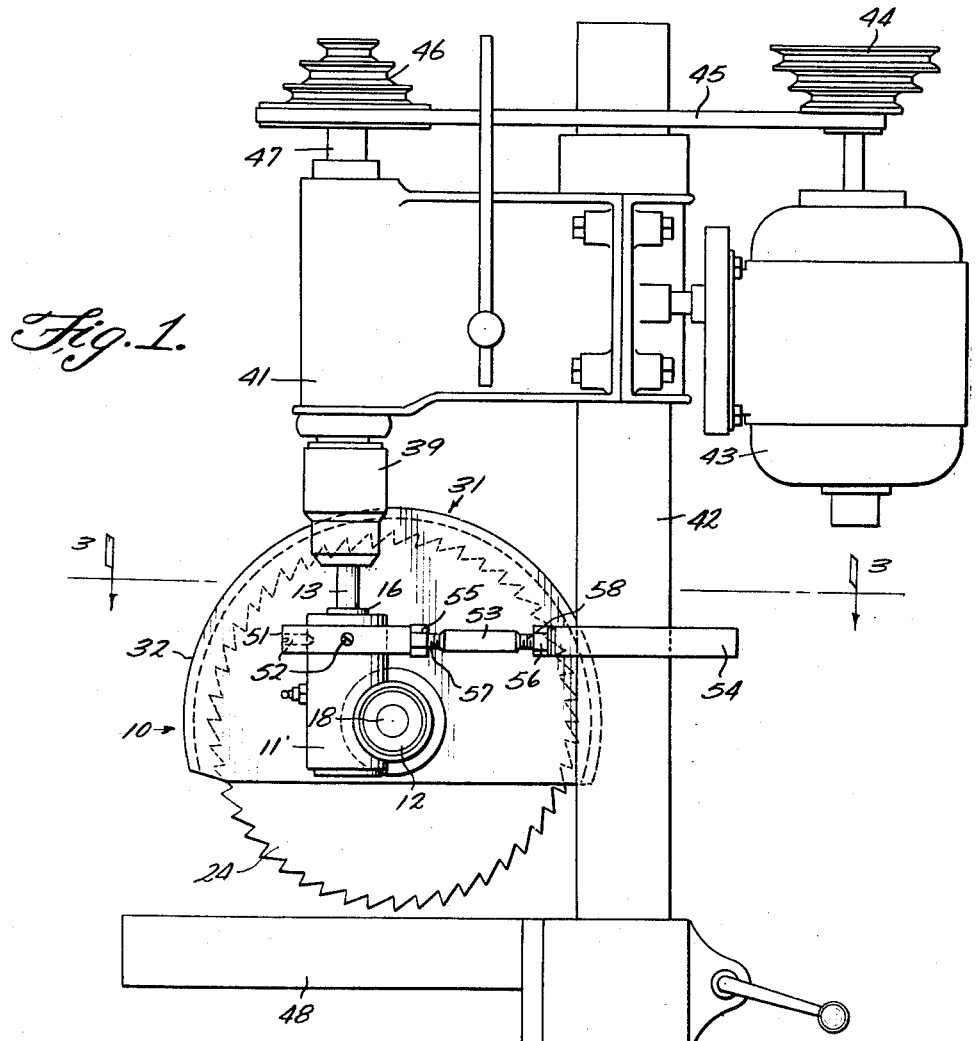
Figure 2:
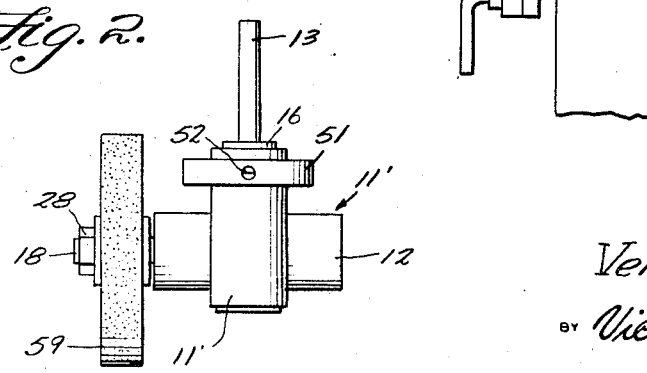
Fig. 2 is an elevational view of the attachment having the grinder wheel thereon.
Figure 3:
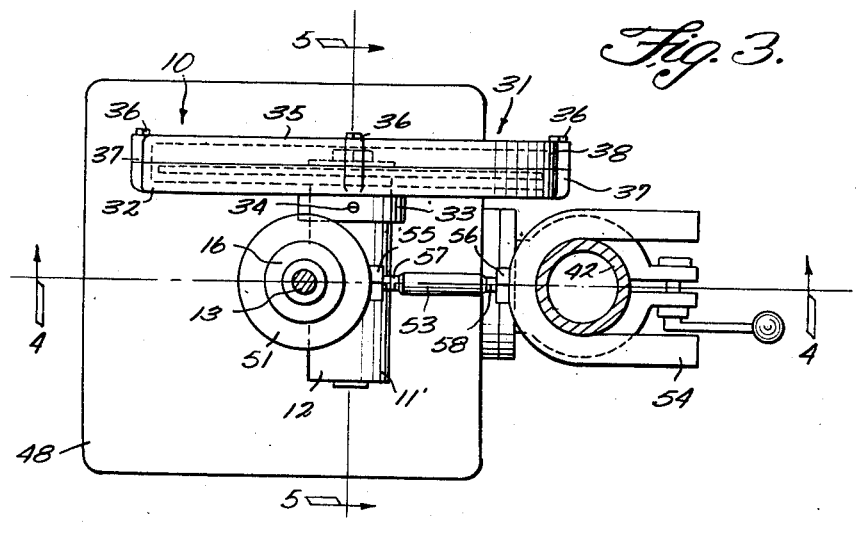
Fig. 3 is a top plan view of the attachment and showing its connection with the drill press, the drill press being in section as viewed on line 3—3 of Fig. 1.
Figure 4:
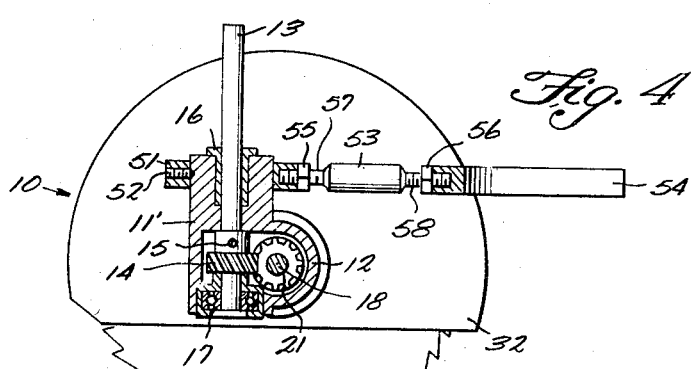
Fig. 4 is a sectional view, in elevation, taken through the attachment on line 4—4 of Fig. 3.

Referring now to the figures, 10 represents the attachment arranged to serve as a saw and 11 represents the attachment arranged to serve as a grinder, Fig. 2. The attachment comprises a T-housing 11' having a vertical portion and a transverse portion 12. This housing contains in its vertical portion a spindle 13 with a spiral gear 14 doweled to the same or held by a set screw 15. This spindle 13 is journalled in a sleeve bushing 16 and in a ball bearing unit 17 tightly fitted within the lower end of the vertical portion 11.

Figure 5:
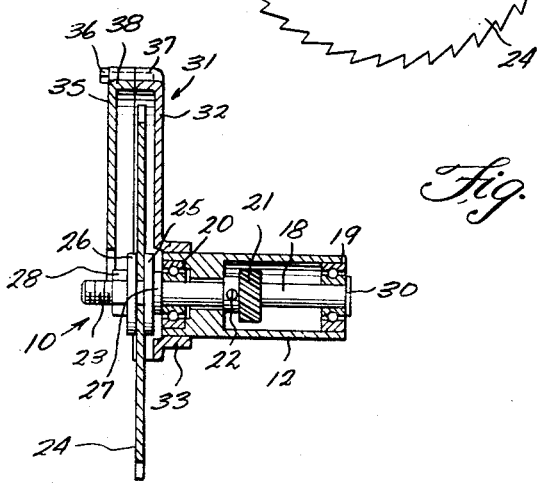
Fig. 5 is a sectional view taken through the attachment on line 5—5 of Fig. 3.

The transverse portion 12 of the housing has a spindle or tool carrying arbor 18 extending through it and mounted in ball bearing units 19 and 20. This shaft is coupled with the gear 14 through a spiral gear 21 connected by set screw 22 or doweled to the shaft 18, Fig. 5. This shaft is threaded at one end as indicated at 23 and receives a rotary saw 24. Clamping washers 25 and 26 are disposed on the opposite sides of the saw and are held with the saw in place against a collar 27 on the shaft by a retaining nut 28. The opposite end of the shaft 18 has a flange 30 for retaining the shaft within the portion 12.

Over the saw may be extended a two-part guard 31 having a part 32 with a sleeve 33 fitting tightly over the portion 12 and retained against rotational displacement thereon by a set screw 34. Another part 35 is secured to the part 32 by screws 36 extending through lugs or bosses 37 and 38 on the respective parts.

The spindle 16 extends above the housing and is adapted to be fitted into a drill chuck 39 rotatable upon an arbor 41 vertically adjustable on a drill press post 42 and driven through an electric motor 43, pulley 44, belt 45, pulley 46 and shaft 47. A drill press table 48 is adjustable upon the drill press post or collar 42.

In order to retain the attachment against rotation with the chuck and to maintain the same aligned with the drill press collar, there is provided on the vertical portion of the housing 11' a ring or set collar 51 secured about the vertical portion by set screws 52. An adjustable link or stud 53 is connected to the collar and extends to a yoke or fork 54 surrounding the column 42 and vertically adjustable thereon. The adjustable link 53 when extended to the proper position is fixed against further adjustment by lock nuts 55 and 56 on the respective threaded portions 57 and 58 thereof and brought to bear respectively against the set ring 51 and the yoke 54. The yoke 54 is adapted to fit drill press columns of different sizes as by pivoting the yoke on the adjusting link 53 before tightening the lock nut 56, the edges thereof may be brought in contacting relation with the sides of the columns and then when the lock nut is tightened the attachment will be rigidly secured in this position. By this means the saw or the grinder assembly may be held firmly in operative position by the support from the column of the drill press even though the column is smaller than the yoke. The attachment will thus be locked against rotation and will be held in the angle to which it has been adjusted. The saw 24 will extend below the attachment and can be elevated to any height by the adjustment of the arbor 41 on the column 42.

If the guard 31 is removed the saw 24 can be replaced by a grinding wheel 59.

While various changes may be made in the detail construction, it shall be understood that such changes shall be within the spirit and scope

I claim:

1. In a machine tool attachment for a drill press having a standard and a vertical spindle parallel to and spaced from the standard, the combination which comprises a gear housing positioned around the spindle and in which the lower end of the spindle is journaled, a tool carrying arbor journaled in the housing and positioned with the axis thereof perpendicular to and spaced from the axis of the spindle, a pair of meshing gears positioned in the housing with one gear mounted on the spindle and the other on the arbor for driving the arbor by the spindle, a bracket positioned around the housing, set screws threaded in the bracket and positioned to engage the gear housing at two oppositely disposed points and at a point between and perpendicular to the said oppositely disposed points for adjustably securing the bracket to the housing, a stud having threaded ends positioned with the inner end threaded into and extended from said bracket on the side thereof adjacent the standard of the drill press, a fork with prongs extended on the sides of the standard and into which the outer end of the stud is threaded, and means clamping a saw on the arbor with the saw positioned in a plane parallel to and spaced from the plane through the axis of the spindle of the drill press.

2. In a machine tool attachment for a drill press having a standard and a vertical spindle parallel to and spaced from the standard, the combination which comprises a gear housing positioned around the spindle and in which the lower end of the spindle is journaled, a tool carrying arbor journaled in the housing and positioned with the axis thereof perpendicular to and spaced from the axis of the spindle, a pair of meshing gears positioned in the housing with one gear mounted on the spindle and the other on the arbor for driving the arbor by the spindle, a bracket positioned around the housing, set screws threaded in the bracket and positioned to engage the gear housing at two oppositely disposed points and at a point between and perpendicular to the said oppositely disposed points for adjustably securing the bracket to the housing, a stud having threaded ends positioned with the inner end threaded into and extended from said bracket on the side thereof adjacent the standard of the drill press, a fork with prongs extended on the sides of the standard and into which the outer end of the stud is threaded, means clamping a saw on the arbor with the saw positioned in a plane parallel to and spaced from the plane through the axis of the spindle of the drill press, and a substantially semi-circular guard U-shaped in cross section and having a hub on one side carried by the housing and positioned over the upper part of the saw.

3. In a machine tool attachment for a drill press having a standard and a vertical spindle parallel to and spaced from the standard, the combination which comprises a gear housing positioned around the spindle and in which the lower end of the spindle is journaled, a tool carrying arbor journaled in the housing and positioned with the axis thereof perpendicular to and spaced from the axis of the spindle, a pair of meshing gears positioned in the housing with one gear mounted on the spindle and the other on the arbor for driving the arbor by the spindle, a bracket positioned around the housing, set screws threaded in the bracket and positioned to engage the gear housing at two oppositely disposed points and at a point between and perpendicular to the said oppositely disposed points for adjustably securing the bracket to the housing, a stud having threaded ends positioned with the inner end threaded into and extended from said bracket on the side thereof adjacent the standard of the drill press, a fork with prongs extended on the sides of the standard and into which the outer end of the stud is threaded, means clamping a saw on the arbor with the saw positioned in a plane parallel to and spaced from the plane through the axis of the spindle of the drill press, and lock nuts on the threaded ends of the stud whereby the position of the fork is adjustable for clamping the edges of the prongs thereof against the side surfaces of the standard of the drill press.

VERNE V. LONG.

REFERENCES CITED

The following references are of record in the file of this patent:

UNITED STATES PATENTS

| Number | Name | Date |
|---|---|---|
| 1,168,355 | Wear | Jan. 18, 1916 |
| 1,352,519 | Laserson | Sept. 14, 1920 |
| 1,623,290 | Wappat | Apr. 5, 1927 |
| 1,850,137 | Pursell | Mar. 22, 1932 |
| 2,464,660 | White | Mar. 15, 1949 |